UNITED STATES PATENT OFFICE.

IGNAZ KREIDL, OF VIENNA, AUSTRIA-HUNGARY.

MANUFACTURE OF WHITE ENAMEL, GLASS, AND THE LIKE.

1,128,691.   Specification of Letters Patent.   Patented Feb. 16, 1915.

No Drawing.   Application filed March 15, 1913.   Serial No. 754,531.

*To all whom it may concern:*

Be it known that I, Dr. IGNAZ KREIDL, partner of the firm Vereinigte chemische Fabriken, Landau, Kreidl, Heller & Co., of Sebastiankohlgasse 5–7, Vienna, XXI, a subject of the Emperor of Austria-Hungary, residing at Sebastiankohlgasse 5–7, Vienna, XXI, in the Empire of Austria-Hungary, have invented a new and useful Improvement in the Manufacture of White Enamel, Glass, and the like, of which the following is a specification.

This invention consists in improvements in my prior invention claimed in my United States Patent No. 1,101,455, issued June 23, 1914, for the manufacture of white enamel, glass and the like, wherein hydrates of metal compounds containing a small quantity of alkali, are employed as opaquing agents. A suitable alkali content for such compounds is found to be from 2–7%; see my specification accompanying application No. 728558.

Now the present invention is based on my discovery that the opaquing power of the hydrates of metal compounds used as an opaquing agent depends not only upon the percentage of contained alkali, but also on the quantity of the combined water of hydration contained in the said hydrates. I have discovered that the same opaquing power can be produced with a large percentage, as with a smaller percentage of alkali, if the percentage of the water of hydration in the hydrates used be varied to correspond.

I have discovered that as the percentage of alkali used is greater, so the percentage of water of hydration must be smaller, and that with a smaller percentage of alkali the percentage of water of hydration must be greater in order to produce the same opaquing power. From this, I have deduced the principle of my present invention according to which every hydrate suitable as opaquing agent will produce its maximum opaquing power when it contains a definite percentage of alkali which varies for each hydrate.

The most favorable percentages of combined alkali and water of hydration for each hydrated compound used as opaquing agent can be readily ascertained by trial.

What I claim is:

1. An opaquing agent for enamels, consisting of a metallic hydrate containing combined alkali, said hydrate containing water in inverse proportion to the combined alkali present.

2. An opaquing agent for enamels consisting of a metallic hydrate poor in alkali and containing water in inverse proportion to the alkali in the compound.

3. An opaquing agent for enamels consisting of a metallic hydrate containing 2%–7% combined alkali and water in inverse proportion to the alkali present in the compound.

4. An opaquing agent for enamels consisting of a hydrated zirconium compound poor in alkali and containing water in inverse proportion to the alkali in the compound.

5. An opaquing agent for enamels consisting of a hydrated zirconium compound containing 2%–7% combined alkali and water in inverse proportion to the alkali present in the compound.

6. A process of manufacturing opaquing agents for enamel comprising dehydrating an alkali-containing metallic hydrate to such an extent that the water remaining is in inverse proportion to the alkali present in the compound.

7. A process of manufacturing opaquing agents for enamel comprising dehydrating a metallic hydrate containing 2%–7% alkali to such an extent that the water remaining is in inverse proportion to the alkali present in the compound.

8. The process of manufacturing opaquing agents for enamel comprising dehydrating an alkali-containing zirconium hydrate to such an extent that the water remaining is in inverse proportion to the alkali present in the compound.

9. A process of manufacturing opaquing agents for enamel comprising dehydrating a zirconium hydrate containing 2%–7% alkali to such an extent that the water remaining is in inverse proportion to the alkali present in the compound.

In witness whereof, I have hereunto signed my name in the presence of two subscribing witnesses.

Dr. IGNAZ KREIDL.

Witnesses:
 HUGO REIK,
 AUGUST FUGGER.